United States Patent
Liebau et al.

(10) Patent No.: US 10,331,955 B2
(45) Date of Patent: Jun. 25, 2019

(54) PROCESS FOR EXAMINING A LOSS OF MEDIA OF A MOTOR VEHICLE AS WELL AS MOTOR VEHICLE AND SYSTEM FOR IMPLEMENTING SUCH A PROCESS

(71) Applicant: Bayerische Motoren Werke Aktiengesellschaft, Munich (DE)

(72) Inventors: Daniel Liebau, Landshut (DE); Claudia Langner, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 50 days.

(21) Appl. No.: 15/624,241

(22) Filed: Jun. 15, 2017

(65) Prior Publication Data

US 2017/0364756 A1 Dec. 21, 2017

(30) Foreign Application Priority Data

Jun. 15, 2016 (DE) .................. 10 2016 210 632

(51) Int. Cl.
*G06K 9/00* (2006.01)
*G06K 9/20* (2006.01)
(Continued)

(52) U.S. Cl.
CPC ......... *G06K 9/00791* (2013.01); *G06K 9/209* (2013.01); *G06K 9/6201* (2013.01); *G07C 5/008* (2013.01); *G07C 5/08* (2013.01); *G08G 1/04* (2013.01); *G08G 1/087* (2013.01); *B60R 1/00* (2013.01); *B60R 2300/302* (2013.01); *B60R 2300/802* (2013.01)

(58) Field of Classification Search
None
See application file for complete search history.

(56) References Cited

U.S. PATENT DOCUMENTS

| 6,570,608 | B1 | 5/2003 | Tserng |
| 9,139,204 | B1 * | 9/2015 | Zhao .................. G01C 21/00 |

(Continued)

FOREIGN PATENT DOCUMENTS

| DE | 25 20 014 A1 | 11/1976 |
| DE | 197 38 007 C1 | 4/1999 |

(Continued)

OTHER PUBLICATIONS

German-language Search Report issued in counterpart German Application No. 10 2016 210 632.5 dated Sep. 29, 2017 with partial English translation (14 pages).

*Primary Examiner* — Shervin K Nakhjavan
(74) *Attorney, Agent, or Firm* — Crowell & Moring LLP

(57) ABSTRACT

A process is provided for examining a loss of media of a motor vehicle. By use of a first camera arranged on a motor vehicle, a driving route in the area in front of a motor vehicle that is driving in the travel direction and is to be monitored is scanned. The route behind the motor vehicle to be monitored is scanned by way of a second camera arranged on a motor vehicle. When scanning the driving route, a forward image and a rearward image are acquired. The two images are compared for detecting a medium lost by the motor vehicle to be monitored. The corresponding medium can be classified. Appropriate actions can be automatically carried out corresponding to the classification of the medium.

17 Claims, 8 Drawing Sheets

(51) Int. Cl.
*G06K 9/62* (2006.01)
*G07C 5/00* (2006.01)
*G07C 5/08* (2006.01)
*G08G 1/087* (2006.01)
*G08G 1/04* (2006.01)
*B60R 1/00* (2006.01)

(56) References Cited

U.S. PATENT DOCUMENTS

| | | | | |
|---|---|---|---|---|
| 2002/0130953 A1* | 9/2002 | Riconda | ............... | G01C 21/36 348/115 |
| 2003/0155538 A1 | 8/2003 | Siepmann | | |
| 2004/0161133 A1 | 8/2004 | Elazar et al. | | |
| 2006/0239508 A1* | 10/2006 | Maki | ............... | G06K 9/00798 382/104 |
| 2007/0091173 A1* | 4/2007 | Kade | ............... | B60W 50/14 348/119 |
| 2008/0055114 A1* | 3/2008 | Kim | ............... | B60R 1/00 340/937 |
| 2008/0240496 A1 | 10/2008 | Senior | | |
| 2008/0247599 A1 | 10/2008 | Porikli et al. | | |
| 2008/0295471 A1 | 12/2008 | Pollklas et al. | | |
| 2009/0088978 A1* | 4/2009 | Ishikawa | ............... | G01C 21/26 701/514 |
| 2011/0106380 A1* | 5/2011 | Wang | ............... | B60R 1/00 701/36 |
| 2011/0106443 A1* | 5/2011 | Ogawa | ............... | G01C 21/3632 701/532 |
| 2011/0234450 A1 | 9/2011 | Sakai et al. | | |
| 2011/0267184 A1* | 11/2011 | Lee | ............... | B60Q 9/005 340/435 |
| 2011/0301846 A1* | 12/2011 | Yanagawa | ............... | G08G 1/16 701/301 |
| 2013/0135478 A1 | 5/2013 | Kim | | |
| 2013/0229523 A1* | 9/2013 | Higgins-Luthman | ............... | B60Q 1/1423 348/148 |
| 2014/0009614 A1* | 1/2014 | Yoon | ............... | G06K 9/00791 348/148 |
| 2014/0050355 A1 | 2/2014 | Cobb | | |
| 2014/0285665 A1* | 9/2014 | Lee | ............... | B62D 15/0295 348/148 |
| 2015/0063647 A1* | 3/2015 | Ryu | ............... | G06K 9/00805 382/104 |
| 2015/0332104 A1* | 11/2015 | Kapach | ............... | G06K 9/6215 382/104 |
| 2016/0101734 A1* | 4/2016 | Baek | ............... | B60R 1/00 348/148 |
| 2016/0377251 A1* | 12/2016 | Kim | ............... | G06K 9/00791 362/466 |
| 2016/0379065 A1 | 12/2016 | Hartmann | | |

FOREIGN PATENT DOCUMENTS

| | | |
|---|---|---|
| DE | 102 06 824 A1 | 8/2003 |
| DE | 10 2008 055 902 A1 | 9/2009 |
| DE | 10 2011 006 216 A1 | 11/2011 |
| DE | 10 2012 208 319 A1 | 5/2013 |
| DE | 10 2013 223 367 A1 | 5/2015 |
| EP | 0 901 011 A2 | 3/1999 |
| EP | 1 327 875 A1 | 7/2003 |
| EP | 1 997 366 A1 | 12/2008 |

* cited by examiner

PROCESS FOR EXAMINING A LOSS OF MEDIA OF A MOTOR VEHICLE AS WELL AS MOTOR VEHICLE AND SYSTEM FOR IMPLEMENTING SUCH A PROCESS

CROSS REFERENCE TO RELATED APPLICATIONS

This application is claims priority under 35 U.S.C. § 119 from German Patent Application No. 10 2016 210 632.5, filed Jun. 15, 2016, the entire disclosure of which is herein expressly incorporated by reference.

BACKGROUND AND SUMMARY OF THE INVENTION

The present invention relates to a process for examining a loss of media of a motor vehicle as well as to a motor vehicle and to a system for implementing such a process.

It is a frequent occurrence that a motor vehicle loses oil while in traffic and leaves an oil slick on the road. Such contaminations of the road are particularly dangerous when the oil mixes with water and covers a wide area on the road as a thin film of oil. There are enterprises which specialize in the removal of such oil slicks. The oil slick can be rapidly and reliably removed by means of a wet cleaning method. However, this results in considerable cost. According to decisions of the German Federal Supreme Court (BGH VI ZR184/10 and VI ZR191/10 of Jun. 28, 2011), in Germany, a motor vehicle owner whose vehicle loses oil, is responsible for refunding the costs of a professional removal of the oil slick.

In addition to oil, motor vehicle may also lose other media. These are, for example, condensation water, gasoline, brake fluid. Condensation water presents no problem and requires no road treatment. When a car loses gasoline, as a rule, the road does not have to be treated because gasoline is very volatile and will evaporate rapidly. However, if it is determined that a motor vehicle is losing gasoline, the motor vehicle should immediately be taken to a repair shop, and the corresponding fuel lines should be examined and repaired. Otherwise, a gasoline gas—air mixture, which is explosive, can form at the motor vehicle.

Sometimes, motor vehicles also lose parts, for example, a portion of the exhaust or other mechanical elements. These parts should be removed from the road as fast as possible, and the corresponding vehicle should be repaired as soon as possible.

German patent document DE 25 20 014 A1 discloses a process for the detection of oil in fluids. In this case, an oil film can be detected optically or by means of electrodes.

In European patent document EP 1 327 875 A1, a process for the determination of oil concentrations in water is described. In this case, the oil concentration in underwater separation tanks is to be determined by means of light scattered in a measuring cell. The intensity of the Raman spectral line is measured, which correlates with the oil concentration in water.

In US 2014/0050355 A1, a computer process is described by means of which images of a film are examined for one or more blotches in the foreground, the patterns of the blotches being analyzed as to whether they represent surface oil.

A loss of media at a motor vehicle can also be detected by way of a level gauge. From German patent document DE 102 06 824 A1, for example, an optical level gauge is known for measuring the level in receptacles for fuel, washing water, oil, hydraulic fluid, etc.

In German patent document DE 10 2008 055 902 A1, a process is described for detecting a loss of oil in a transmission having a countershaft. A loss of oil is detected here by means of the course of the rotational speed of a countershaft of a transmission.

Furthermore, an oil aging sensor is indicated in European patent document EP 0 901 011 A2, by means of which the oil quality in a motor vehicle can be determined.

From U.S. Pat. No. 6,570,608 B1, a monitoring system is known by which a film (video) is analyzed and it is determined whether persons are entering a motor vehicle or are exiting a motor vehicle. In this case, differential images are produced in order to recognize the motor vehicles and the objects in front of the respective background.

US 2004/0161133 A1 discloses a method of monitoring and detecting unattended objects, such as luggage, vehicles or persons. The objects can be recognized according to predefined characteristics, such as their size or their type of movement. An alarm message will be emitted after a predefined time period.

A similar method for detecting left-behind objects is described in US 2008/0247599 A1.

A further method for extracting objects from an image data stream is known from US 2007/0250898 A1.

In US 2008/0240496 A1, a further method is known for analyzing image data streams, wherein superimposed objects are combined to form attributes.

In German patent document DE 10 2011 006 216 A1, a method is disclosed for the detection of dividing lines imaged on the road. By means of electromagnetic waves, the road surface is scanned in the direction of the vehicle width.

German patent document DE 10 2013 223 367 A1 discloses a method and a device for determining a road covering by way of a vehicle camera system. At least one image of a vehicle environment is taken by the vehicle camera system. This image is analyzed in order to detect evidence of precipitation and/or the presence of a road covering when the vehicle having the vehicle camera system or another vehicle drives over the road. The result of the determination of the road covering or of the coefficient of friction estimate derived therefrom can be outputted as a driver assistance function, a vehicle control function or also as information to a driver.

From European patent document EP 1 997 366 A1, an agricultural harvesting machine is known which has a foreign-body detection system, wherein foreign bodies are detected by a metal detection device.

In German patent document DE 197 38 007 C1, a method is described for the detection of the success of decontamination exercises. In this case, a contamination is simulated by way of a fluorescence-dye-containing oil film. After the removal of the oil film, the corresponding area is irradiated by fluorescence-stimulating light, so that residues of the oil can be easily and reliably determined.

The above-explained state of the art illustrates, on the one hand, that the contamination of a driving route or of a road by means of media, particularly oil, presents a considerable danger to the traffic that follows. In addition, the loss of certain media (gasoline, vehicle parts) may point to a danger situation at the motor vehicle that has lost the medium.

The inventors of the present invention recognized that there is a considerable need for automatically recognizing and evaluating such a loss of media.

The invention is therefore based on the object of creating a process for examining a loss of media of a motor vehicle as well as a motor vehicle and a system for implementing such a process, by which a loss of media at the motor vehicle can be reliably detected.

This and other objects are achieved by the process for examining the loss of media in accordance with embodiments of the invention.

In the case of the process for examining a loss of media of a motor vehicle according to the invention, by way of a first scanning device arranged on a motor vehicle, a route in the area in front of a motor vehicle that is driving in the travel direction and is to be monitored, and by way of a second scanning device arranged on a motor vehicle, the route behind the motor vehicle to be monitored, is scanned, wherein, when scanning the driving route, at least a forward and a rearward image are acquired, and the forward and rearward images are compared for detecting a medium lost by the motor vehicle to be monitored.

By way of the process according to the invention, the route, along which a motor vehicle to be monitored, is moving in the travel direction, is therefore scanned in the front in the travel direction and in the rear in the driving direction with respect to the motor vehicle by use of a scanning device, so that, via the thus acquired forward and rearward images, a loss of a medium can be detected. This loss is illustrated in the rearward image, but not in the forward image.

A scanning device in the context of the present invention is any device by which a two-dimensional or three-dimensional image of a driving route can be acquired. Such scanning devices are particularly an optical camera, an infrared camera, a laser scanner, a running-time camera, a stereo camera.

In order to permit a continuous monitoring of a media loss, forward and rearward images are taken at regular intervals, wherein the time interval can be adapted corresponding to the driving speed of the motor vehicle to be monitored. As a result a plurality of images are present, wherein preferably a forward image and a rearward image are assigned to one another in pairs respectively. The assignment can take place, for example, by use of a time stamp and/or location stamp, images with essentially the same location stamp being assigned to one another. When a time stamp is used, the driving speed of the motor vehicle or the speed of the corresponding traffic and the thereby covered path between the scanning of the forward image and the scanning of the rearward image are to be taken into account. The assignment of the images may also take place as an alternative to or in connection with a characteristics analysis of the images, wherein certain specific characteristics are extracted from the respective images, and the images are assigned to one another such that the largest number of these specific characteristics are contained in the two mutually assigned images (forward image and rearward image).

Such an analysis of characteristics may also be used for causing the forward and the rearward image respectively to mutually coincide. The respectively mutually assigned forward and rearward image, as a rule, do not exactly contain the same detail of the route. The forward and the rearward image are therefore preferably caused to coincide such that the corresponding specific characteristics are mutually superimposed, in order to then compare the two images.

The two images (forward image and rearward image) may also deviate from one another in the resolution, in the contrast, in the color representation and/or in the perspective. It is therefore useful to mutually adapt the images. If scanning devices, which are provided on the same motor vehicle, are used for acquiring the forward and rearward images, the characteristics of these scanning devices, such as the viewing direction, the focus, the resolution, are known, as a rule, so that the corresponding images can be adapted to one another by means of these known characteristics. If the scanning device has a zoom lens, the focus can be changed. The focus can be indicated in an angle range or at an imaging scale. However, if the scanning devices are arranged on different vehicles, it is probable that different types of scanning devices are used, of which, on the one hand, not all characteristics, such as the viewing direction or focus, are known or are not known with the same accuracy. In addition, the quality of the images, which are acquired by means of different types of scanning devices, may differ considerably. In such a situation, it is then useful to analyze the two images, in which case, also here, an analysis of characteristics may again be carried out or reused, in order to determine and mutually adapt the resolution, the contrast, the color representation and/or the perspective. This adaptation and/or alignment of the images can also be supported by use of acquired geographical coordinates assigned to the images.

The comparison of the two images preferably takes place by producing a differential image, the differential image showing all objects that are contained in only one of the two images. These objects are analyzed according to predefined rules. These rules are, for example:
  Determination of a number of characteristics on a photo raster of both images;
  determination of the coordinates (for example, in the center of the characteristics) of both images;
  comparison of images with respect to the number of characteristics;
  area determination of the new characteristics;
  determination of the light reflection of the characteristics for recognizing the medium;
  storing the identified old and new characteristics with the coordinate and detected time.

The analysis of the objects can take place by use of the differential image and/or by use of the rearward image.

The analysis of the objects takes place, for example, by way of a shape analysis and/or a spectral analysis.

Several rearward images, which each show the object to be analyzed, can also be analyzed jointly via triangulation and/or characteristics analysis, so that a three-dimensional description of the surface of the object is produced. This corresponds to a stereo camera, in the case of which, instead of two cameras, only one camera is used, by which the images can be taken with a time offset.

The forward and rearward images can be taken by at least two scanning devices, which are arranged on different motor vehicles. These scanning devices may be arranged on a motor vehicle driving in front of the motor vehicle to be monitored as well as on a motor vehicle driving behind the motor vehicle to be monitored. However, one scanning device may be arranged on the motor vehicle to be monitored and another scanning device may be arranged on motor vehicle driving ahead or following. The images are preferably forwarded to a server, on which they are compared. As an alternative, it is also contemplated to exchange the images by way of a car-to-car communication between the motor vehicles and carry out the comparison of the images in a control device of one of the motor vehicles.

When a predefined medium is detected, one of the following actions can be carried out:
  the vehicle driver of the monitored vehicle will be informed;

a public authority, such as the police or the Road Traffic Department will be informed;

traffic participants will be informed by means of car-to-car communication and/or light signals and/or honking.

The motor vehicle according to the invention has at least a front scanning device and a rear scanning device for the scanning of a route, and a control device. The control device is designed for implementing one of the above-explained processes.

A system for implementing one of the above-explained processes comprises at least two scanning devices, which are arranged on a motor vehicle, the motor vehicle having a data connection to a server situated outside the motor vehicle, which server compares the forward and rearward images. The scanning devices may be arranged on the same motor vehicle or on different motor vehicles.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
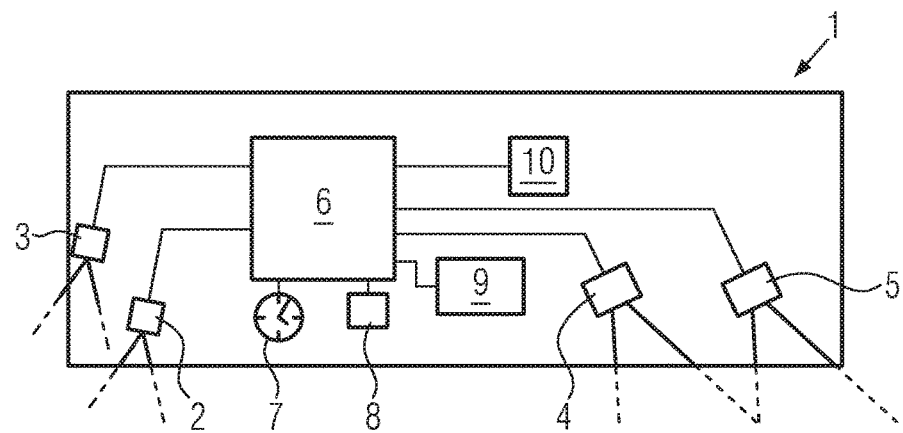
FIG. 1 is a schematic view in a block diagram of essential elements of a motor vehicle for implementing a process for examining a loss of media.

FIG. 1 schematically illustrates a motor vehicle 1 according to the invention. In FIG. 1, the elements, which are known per se and are required for the progressive motion of the motor vehicle, are omitted, such as the engine, the transmission line, the wheels, the vehicle occupant compartment, etc., for simplifying the drawings. The motor vehicle 1 has an optical front camera 2, an infrared front camera 3, an optical rear camera 4 and an infrared rear camera 5. The cameras 2-5 are each connected with a central control device 6, which may be processor based. The central control device 6 is coupled to a clock 7 and to a navigation system 8. The central control device 6 is further connected with a central vehicle control 9, wherein all essential parameters, such as the velocity, the rotational speed of the engine, the rotational speed of the individual wheels, the gear selection, etc., are electronically present and can be accessed by the central control device 6.

The central control device 6 is connected with a display device 10, by way of which messages can be transmitted to the vehicle driver.

By use of the cameras 2-5, the motor vehicle 1 can scan a driving route, can produce images of the route and can evaluate the images in the central control device 6 in order to examine a loss of media of a motor vehicle. By use of the optical cameras 2, 4, images can be taken of the driving route in the visible wavelength range of the light. By use of the infrared cameras 3, 5, infrared images are taken of the driving route, which images show the thermal condition of the surface of the driving route. When a motor vehicle loses oil, for example, as a result of the fact that the temperature of the oil is higher than the ambient temperature, this oil can be detected rapidly and reliably.

Figure 2:
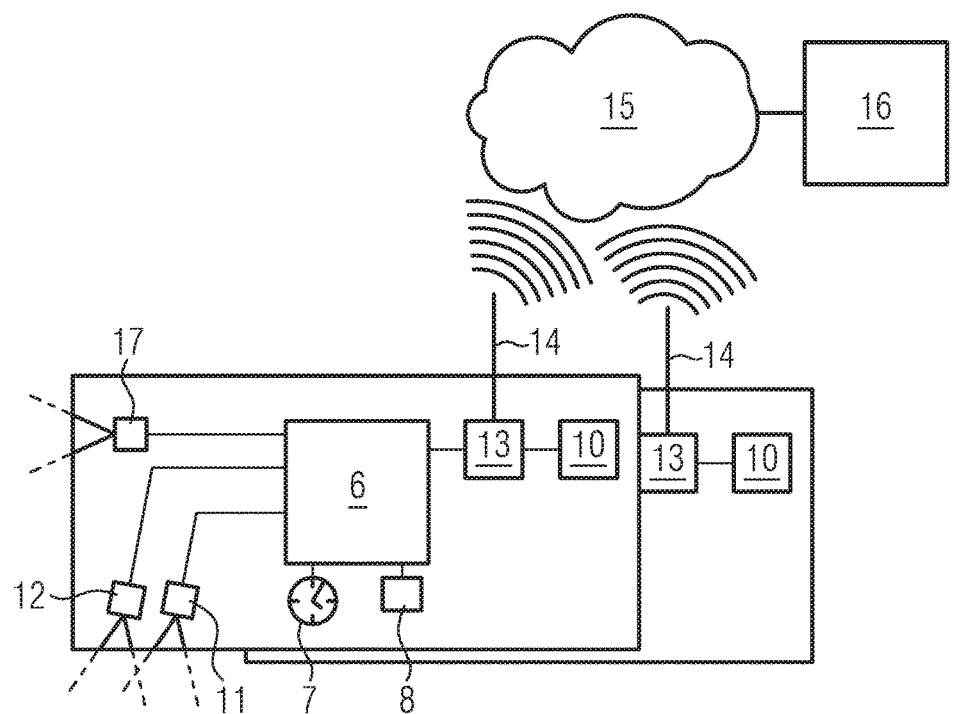
FIG. 2 is a schematic view in a block diagram of a system having several motor vehicles and a central server for implementing a process for examining a loss of media.

FIG. 2 illustrates a second embodiment of a system according to the invention for examining a loss of media of a motor vehicle. In the second embodiment, identical parts are marked by the same reference numbers as in the first embodiment. This embodiment has several motor vehicles 1, which each have an optical camera 11 and an infrared camera 12. The cameras 11, 12 may be arranged at the front or at the rear of the motor vehicle. It is also contemplated that, in each case, an optical camera and/or an infrared cameras are provided on the front as well as on the rear of the motor vehicle. The cameras 11, 12 are connected with the central control device 6, to which, in turn, a clock 7 and a navigation system 8 are coupled.

The central control device 6 is connected with a radio interface 13 to which an antenna 14 is connected. By way of the antenna, a radio data connection to a data network (WAN: Wide Area Network) 15 and particularly, the Internet, can be established. A server 16 is connected to the data network 15. By means of their cameras 11, 12, the individual motor vehicles scan a driving route and transmit the corresponding images by way of the data network 15 to a server 16. The images can be analyzed at the server 16, as explained in detail below.

The motor vehicles 1 are equipped with one display device 10 respectively, which, by way of the radio interface 13 receive and display messages from the server 16, in order to thereby inform the respective vehicle driver of the motor vehicle. The vehicles 1 may further have a front-horizontal camera 17, in order to be able to acquire a motor vehicle driving ahead when determining a loss of media of the motor vehicle, in order to, when determining a loss of media of the vehicle driving ahead, be able to acquire identification information of the motor vehicle, particularly the license plate and transmit it to the server 16 by way of the data network 15.

In the following, the basic process principle will be explained by way of FIG. 3, by which a loss of media of a motor vehicle can be examined by the motor vehicle according to the first embodiment (FIG. 1) as well as by the system according to FIG. 2.

The process starts in Step S1.

In the traveling direction, in front of a motor vehicle to be examined in the traveling direction, a forward image data stream is produced by the cameras 2, 3 and 11, 12 respectively, which comprises a row of successive forward images. The individual images are taken at predefined time intervals or local clearances, in which case, the vehicle velocity provided by the central vehicle control 9 can be taken into account. The faster the vehicle is driving, the shorter the time intervals, between which a forward image is taken. All forward images are provided by the central control device 6 with a time stamp and/or location stamp, which indicates at which point in time and/or in which location the corresponding images of the driving route had been taken. The time information is provided by the clock 7, and the location information is provided by the navigation system 8.

A rearward image data stream is produced in the same manner as the forward image data stream, wherein the cameras 4, 5 and 11, 12 respectively are used, and the driving route is scanned behind the motor vehicle to be examined. The images of the rearward image data stream are provided in the same manner with at time stamp and/or a location stamp.

In the first embodiment (FIG. 1), the image data of the forward and rearward image data stream are evaluated and analyzed in the central control device 6. In the second embodiment, the image data of the forward and rearward image data stream are transmitted by way of the data network 15 to the server 16 and are evaluated and analyzed there.

During this evaluation or analysis, an image of the forward image data stream and an image of the rearward image data stream are assigned to one another (Step S3), this assignment taking place by means of the time stamp and/or location stamp. If the respective images contain a location stamp, the corresponding images of the same location or of a location that is as similar as possible are assigned to one another. When the images contain no location stamp but only a time stamp, the images can be mutually assigned by the point in time at which they had been acquired, while taking into account the driving velocity of the motor vehicle or of the traffic, so that those images of the driving route are assigned to one another which had been taken at the same location or at a location that is as similar as possible. If the speed of the traffic is used for the assignment of a pair consisting of a forward and a rearward image, it will be useful, in the case of the second embodiment, to transmit the velocity of the motor vehicle existing in each case when an image is taken, by way of the data network 15 to the server 16. Because the forward and the rearward image are taken by different motor vehicles, which may change their velocity before they each have driven over the same location of a driving route, it may be useful to average or to integrate the velocity by way of the time interval between the taking of the forward image and the rearward image.

When assigning a forward and a rearward image according to Step S3, a characteristics analysis of the images may also be carried out and specific characteristics may be extracted. The images in which most characteristics coincide will then be assigned to one another.

If a pair of forward and rearward images is assigned, in a Step 4, the images are mutually adapted with respect to resolution, contrast, color representation and/or perspective. In this case, it is mainly useful to adapt at least the perspectives to one another, so that the images can be mutually superimposed and the pixels arranged above one another in each case represent the same location of the driving route. Since, as a rule, by means of their perspectives, the cameras include different inclination angles with respect to the surface of the driving route, such a correction of the perspective is often necessary.

The above-explained characteristics analysis, in terms of the adaptation and superimposition of the images, can also be used such that the forward and the rearward image are mutually adjusted, so that the special characteristics are situated precisely above one another.

The mutually assigned forward and rearward images are compared in Step S5. Here, the comparison takes place in that a differential image is created of the two images. However, other processes may also be used for the comparison of images.

Because the forward and the rearward image can often not be adapted to one another in an absolutely precise fashion, the differential image contains many small speckles. These can be ignored. Only areas which have a defined minimum size will be considered objects in the differential image. If the forward image and the rearward image are thermal images, objects are recognized by means of a predefined minimal temperature difference.

In Step S6, it is examined whether the differential image contains at least one object. If it is determined in Step S6 that no object is present, the process sequence will change over to Step S7. In Step 7, it is examined whether additional images of the image data streams are present. If this is so, the process sequence will change over to Step S3. Should there be no more additional images, the process will be terminated with Step S8.

If, in contrast, it is determined in Step 6 that an object is contained in the differential image, the process sequence will change over to Step S9. In Step S9, the object or objects is/are subjected to an optical analysis. The optical analysis mainly takes into account the shape and/or color (=spectral analysis) of the objects. The objects can be analyzed in the differential image or in the rearward image, in which case, when the rearward image is used, those areas are read out as objects which had been considered an object in the differential image. When infrared cameras are used, the optical analysis can also be combined in connection with an analysis of the temperature of the objects. Within the scope of the invention, it is also contemplated to use a scanning device which permits a three-dimensional scanning of the objects. Such a scanning device is, for example, a laser scanner, a running-time camera or a stereo camera. When such a scanning device is used, the three-dimensional contour can also be taken into account during the analysis. It is also contemplated to determine the three-dimensional contour of an object by way of several successive images by means of triangulation and/or characteristics analysis. In this case, the individual images should each show the object from a slightly different position or perspective. So that such a three-dimensional analysis becomes possible, the relative position of the camera should be determined very precisely in the case of the individual takes. Because the movement of a modern motor vehicle is often acquired very precisely, this can be done. Thus, in the case of modern motor vehicles, often the rotational speeds of all four wheels connected with the surface are monitored and acquired independently of one another, so that the movement of the motor vehicle and thereby of the camera is acquired in a very exact manner.

The objects are classified by way of this analysis. In this case, mainly the following objects or media are classified:
 oils
 coolant
 fuel
 vehicle parts (exhaust, underbody coating, exterior components)
 trash (cigarettes, cups, paper, foils, etc.)

As a function of the classified objects, predefined actions are carried out in Step S10. If it is determined, for example, that the object is oil, the driver of the monitored vehicle is informed of the loss of oil; a public authority, such as the police or the Road Traffic Department is informed, and/or, by way of car-to-car communication, light signals and/or honking, other traffic participants are informed of the dangerous situation.

If the monitored object is gasoline, the driver of the monitored vehicle receives a danger warning because an explosive gasoline/air mixture may be forming in his vehicle. He then should either immediately park the car or drive to the nearest repair shop.

If the examination of the loss of medium is carried out by cameras which are not arranged on the motor vehicle to be examined, by way of the motor vehicle which follows the motor vehicle to be examined in traffic, by means of the front-horizontal camera 17, the motor vehicle to be examined is acquired and an image for identifying the motor vehicle is transmitted by way of the data network 15 to the server 16 or an authorized authority, for example, the police, which can identify the motor vehicle driver by way of the license plate and can inform him correspondingly.

In the following, several embodiments of the invention will be explained by means of FIGS. 4-9.

Figure 4:
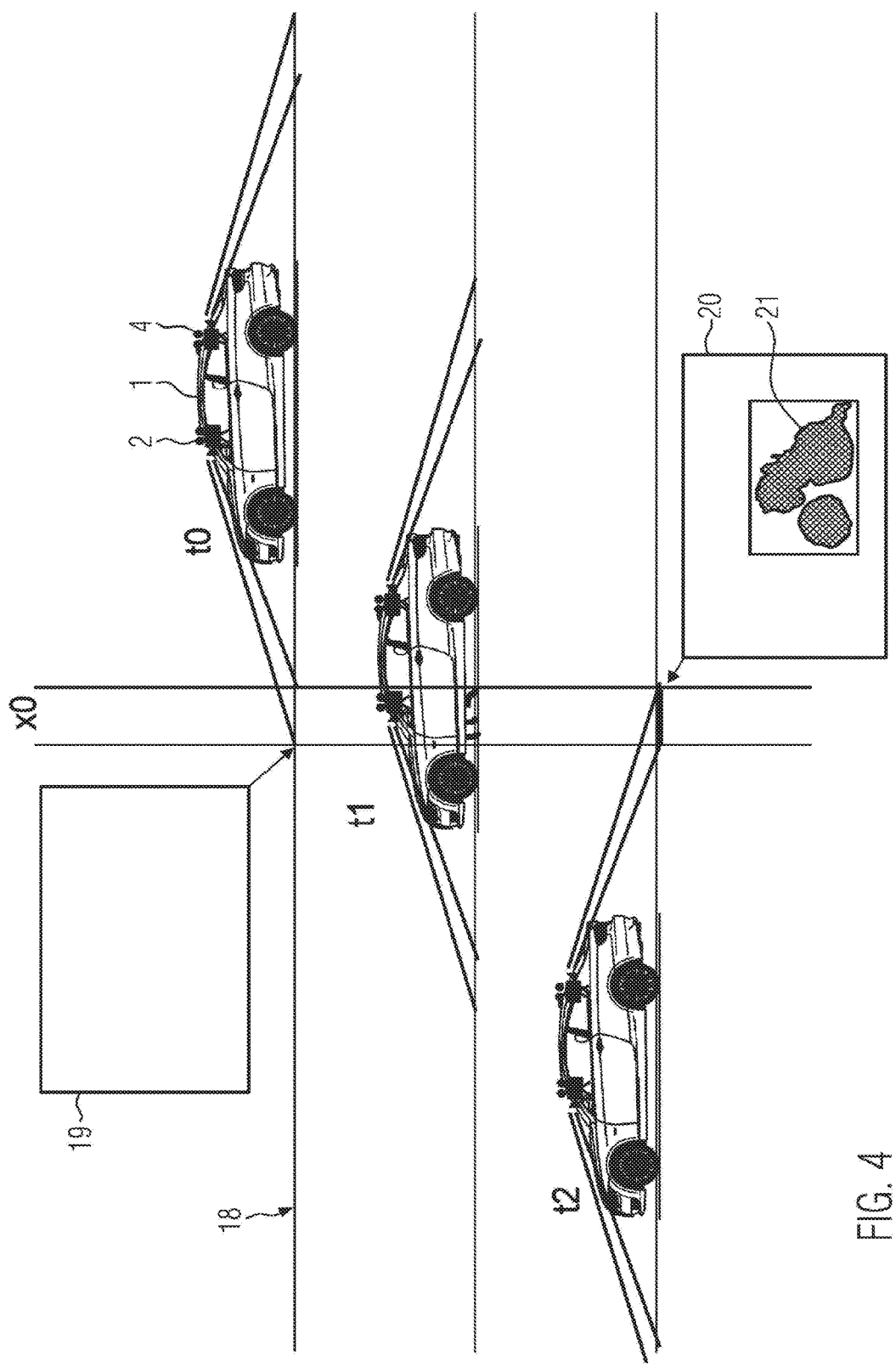
FIGS. 4 to 9 are views of different embodiments of the process according to the invention, in each case, with a schematic representation of the events of acquiring the forward image, media loss, acquiring the rearward image.

The first embodiment illustrated in FIG. 4 corresponds to the first example, wherein the motor vehicle 1 has an optical front camera 2 and an optical rear camera 4. By way of the optical front camera 4, a forward image data stream of the driving route 18 is produced and, by way of the optical rear camera, a rearward image data stream of the same driving route 18 is produced. At a point in time t0, the location x0 of the driving route 18 is acquired by the optical front camera 2, and a forward image 19 is produced.

At a point in time t1, the motor vehicle 1 is in location x0 and is losing oil (t1>t0).

At a point in time t2, the optical rear camera 4 acquires the driving route 18 in location x0 and produces a corresponding rearward image of the driving route 18 from location x0. In contrast to the forward image 19, the rearward image 20 shows oil slicks 21.

Figure 3:
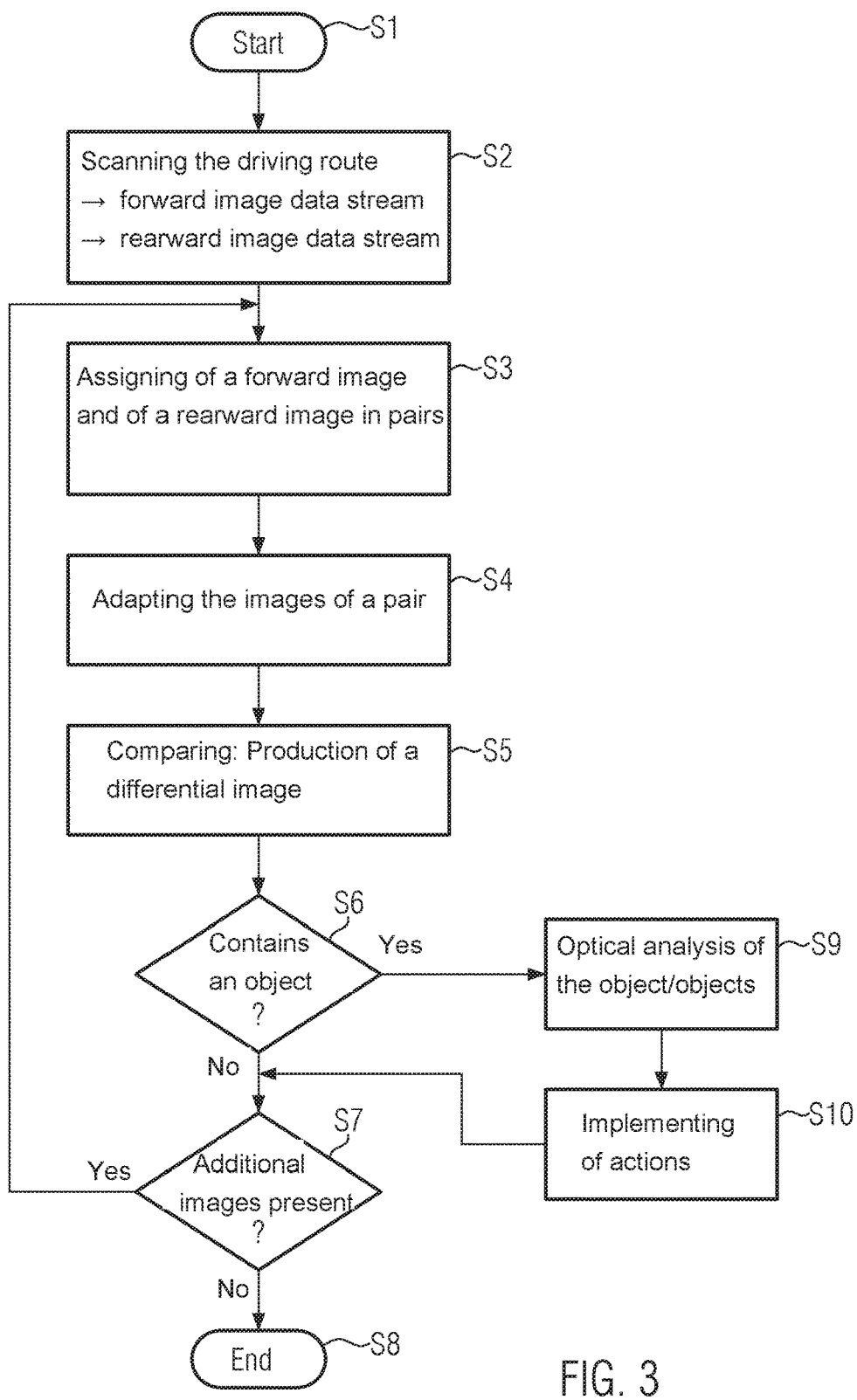
FIG. 3 is a view of a flow chart of a process for examining a loss of media of a motor vehicle.

The two images 19 and 20 are analyzed and evaluated by way of the method explained in FIG. 3 above, so that the loss of oil of the motor vehicle 1 is determined and corresponding actions are implemented.

Figure 5:
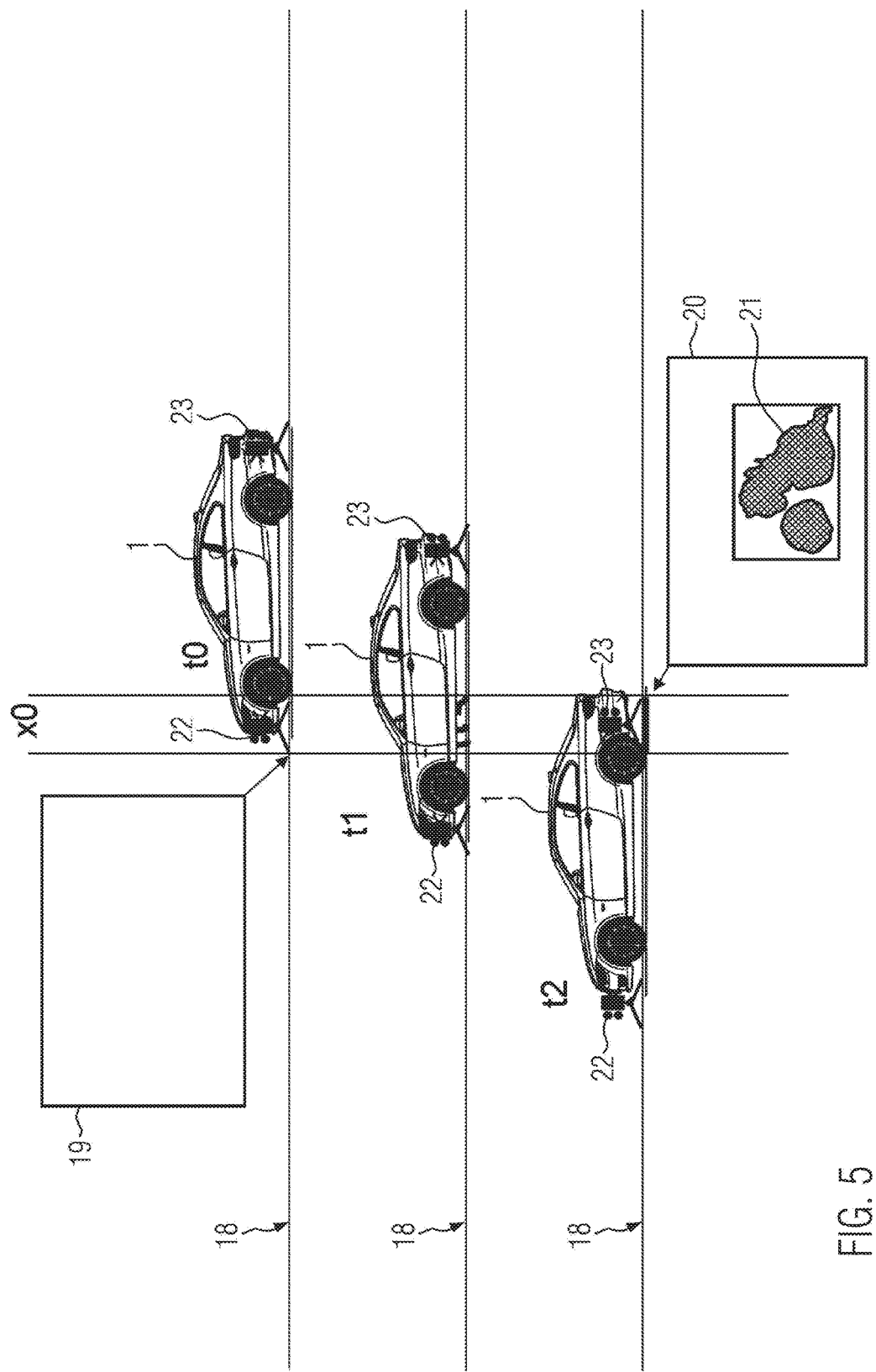

The embodiment according to FIG. 5, in turn, corresponds to the first example (FIG. 1) and is similar to the embodiment according to FIG. 4. It differs from the embodiment according to FIG. 4 in that, instead of the optical camera with a perspective diagonally toward the front or a perspective diagonally toward the rear, a stereo video camera 22 provided on the front of the motor vehicle is used which has an illumination for night vision, and a rearward stereo video camera 23 is used which is provided at the rear and also has an illumination for night vision. The two stereo video cameras 22, 23 are arranged perpendicularly downward with their viewing direction. Such an arrangement has the advantage that both cameras 22, 23 acquire the driving route 18 essentially with the same perspective. In addition, a thermal imaging camera can be arranged at the front and at the rear of the motor vehicle 1.

By way of the forward stereo video camera 22, the driving route is acquired at the point in time t0 in location x0, and a forward image 19 of the driving route 18 is produced. At the point in time t1 (t1>t0), the motor vehicle 1 is in location x0 and is losing oil. At the point in time t2, the motor vehicle 1 is situated with its rear in location x0 of the driving route and, by way of the rearward stereo video camera 23, acquires the driving route 18 in location x0, and thereby generates a rearward image 20. The rearward image 20 contains oil slicks 21. These are again analyzed and evaluated by the process explained above by FIG. 3, in order to implement corresponding actions.

Figure 6:
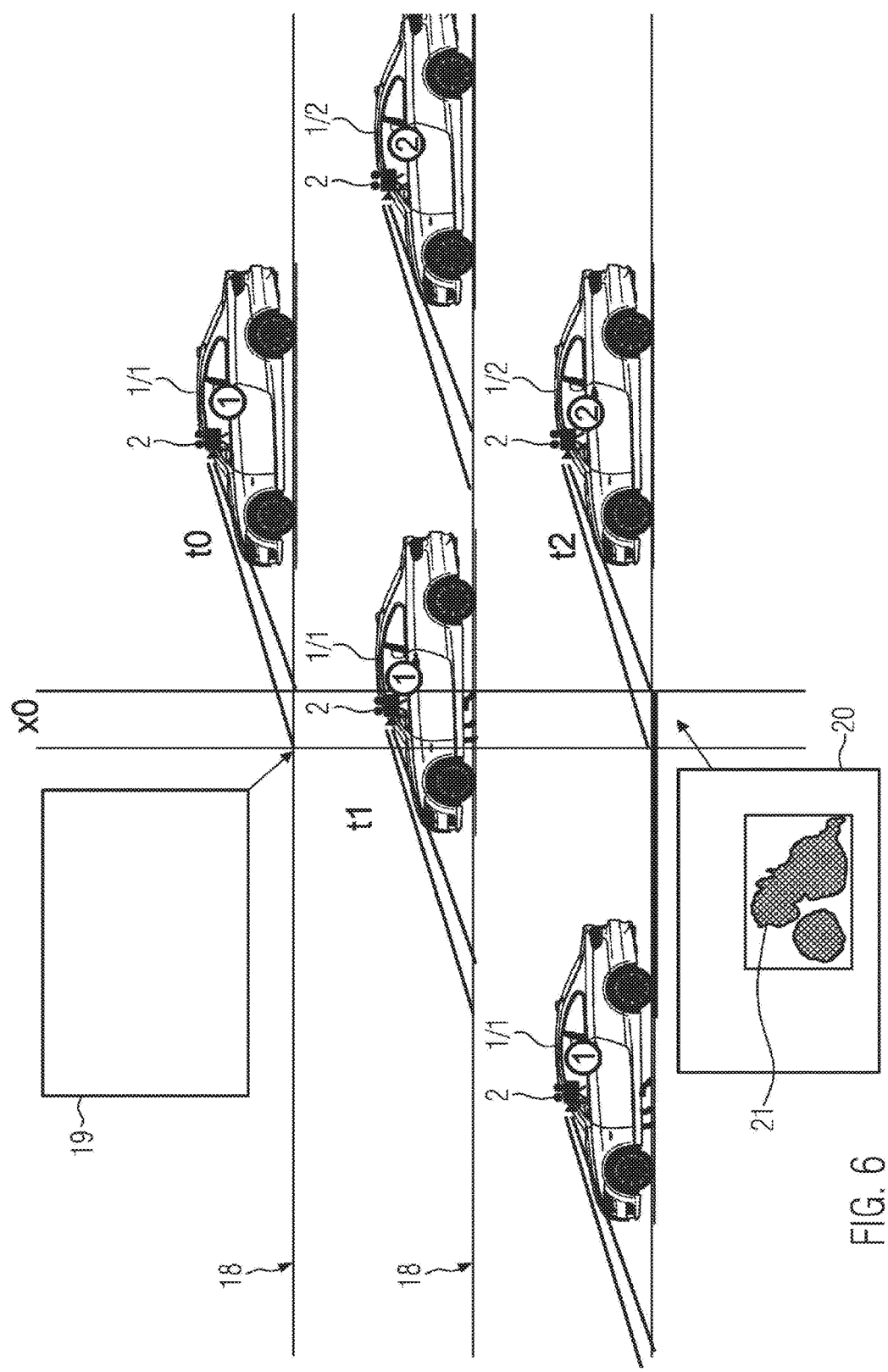
Figure 7:
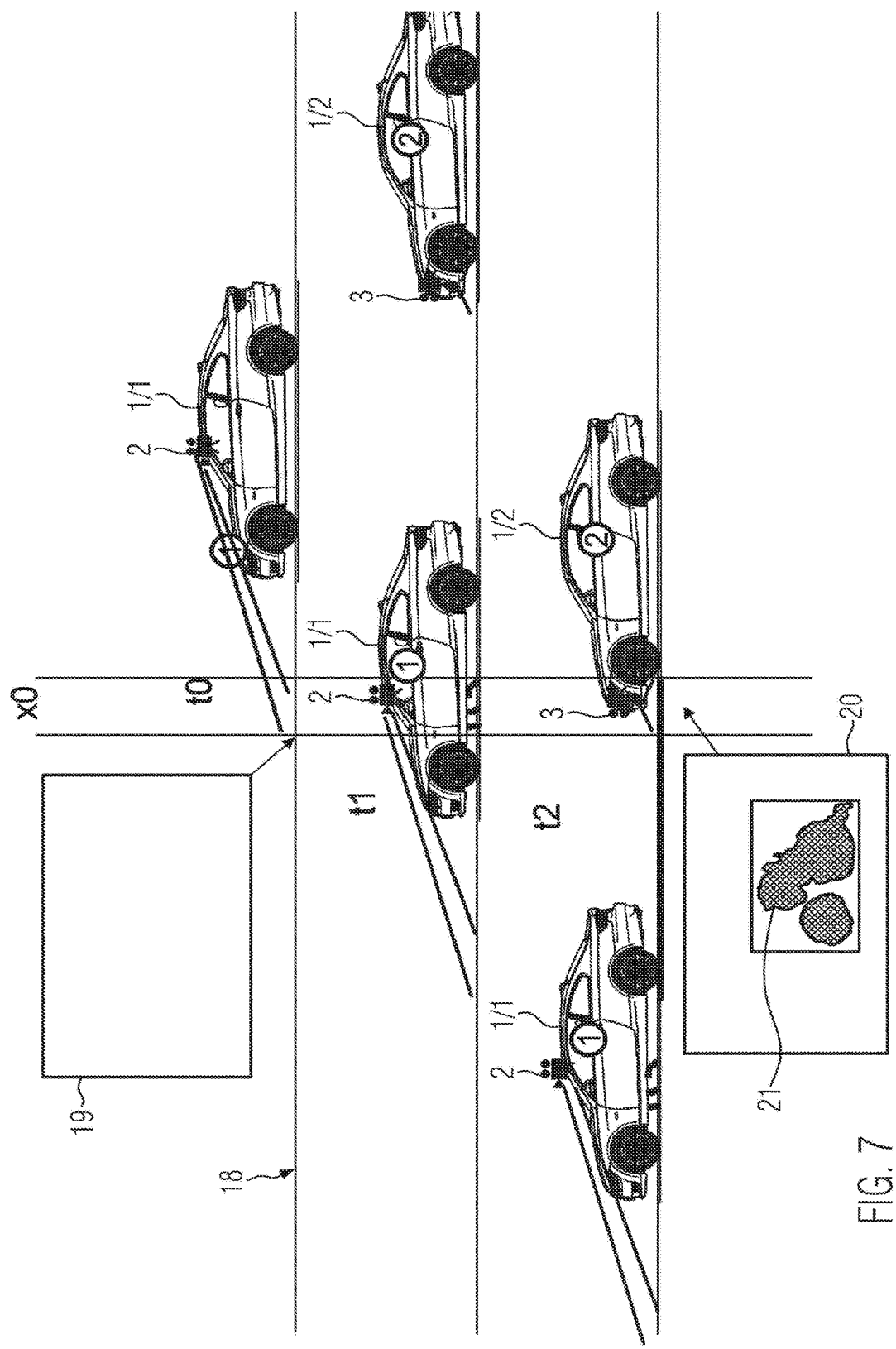
Figure 8:
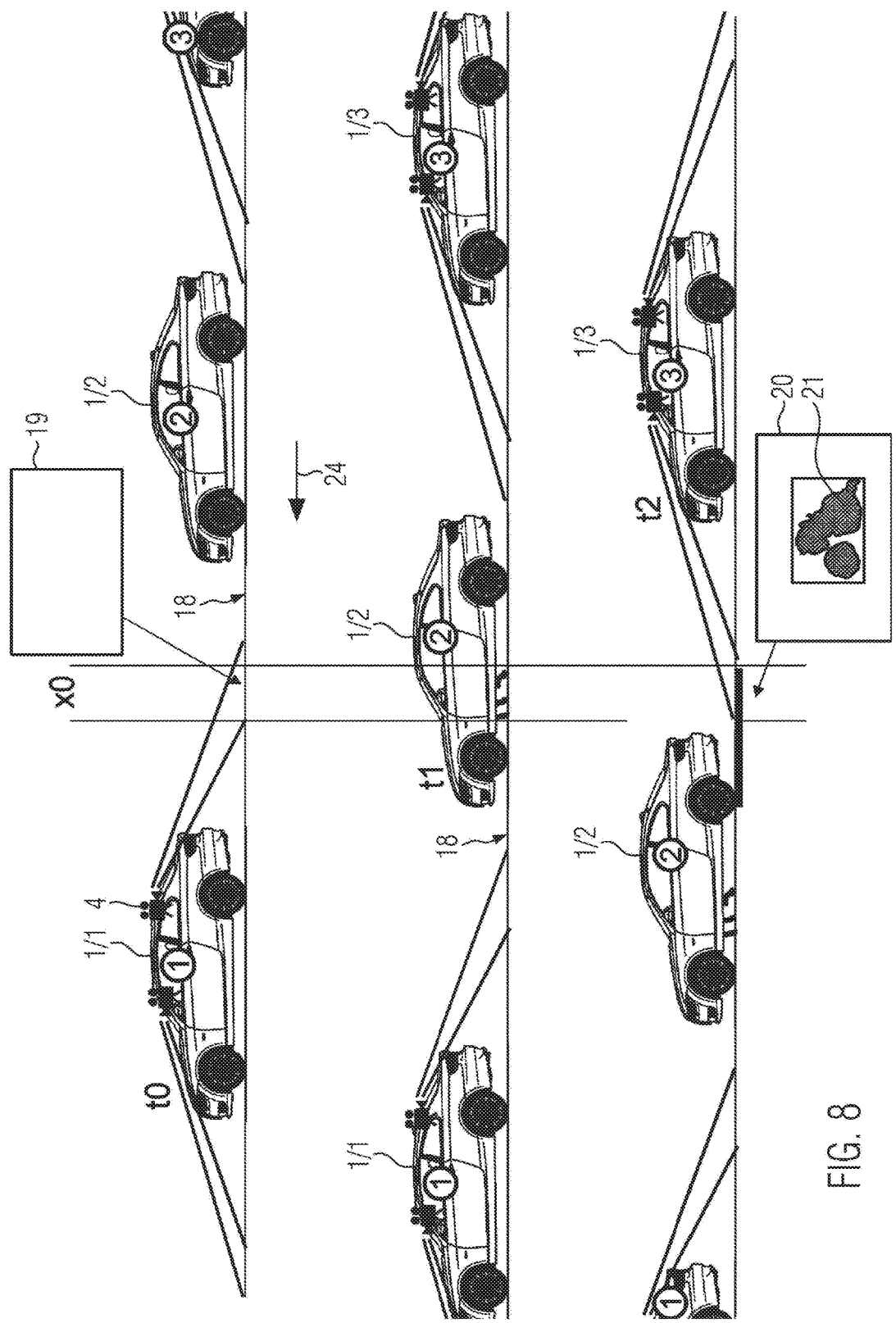

The third embodiment according to FIG. 6 corresponds to the second embodiment (FIG. 2). A first motor vehicle 1/1, which represents the motor vehicle to be examined, has an optical front camera 2, whose viewing direction is oriented diagonally toward the front. At the point in time t0, the optical front camera acquires the driving route in location x0 and produces a forward image 19 of the driving route 18 in location x0. At the point in time t0, the optical front camera 2 acquires the driving route in location x0 and produces a forward image 19 of the driving route 18 in location x0.

The forward image 19 is transmitted by way of the data network 15 to the server 16.

At the point in time t1 (t1>t0), the first vehicle 1/1 is in location x0 and is losing oil.

A second motor vehicle 1/2, in turn, has an optical front camera 2, which is oriented diagonally toward the front with its viewing direction. At a point in time t2 (t2>t1), the optical front camera of the second vehicle 1/2 acquires a rearward image 20. The rearward image 20 is also transmitted by way of the data network 15 to the central server 16. The central server 16 evaluates the thus obtained images corresponding to the process explained above by means of FIG. 3.

The fourth embodiment (FIG. 7) corresponds essentially to the third embodiment (FIG. 6), in which case, it is distinguished mainly by the fact that the first motor vehicle 1/1 has on its front an optical front camera 2, which is oriented diagonally toward the front with its viewing direction. The second motor vehicle 1/2 has an infrared front camera 3.

By way of the optical front camera, the driving route 18 is optically scanned. By way of the acquired image, it can be recognized that no oil contamination is present. The first motor vehicle 1/1 is losing oil at the point in time t1. The corresponding oil slicks are acquired by the second motor vehicle 1/2 by the infrared camera 3, in which case, a rearward thermal image 20 is produced, which shows the warm oil slick.

In the fifth embodiment (FIG. 8), a loss of media is detected at a motor vehicle 1/2, which itself has no scanning device for scanning the driving route 18. A vehicle 1/1 driving ahead of the latter vehicle in the traveling direction 24 has at least one optical camera 4, by which this motor vehicle at the point in time t0 scans the driving route 18 in location x0 and produces a forward image 19. This forward image 19 is provided with a location and time stamp and is transmitted by way of the data network 15 to the central server 16.

The motor vehicle 1/1 is followed in traffic by the motor vehicle 1/2 which, at the point in time t1 (t1>t0), is situated in location x0 and is losing oil there. A motor vehicle 1/3 is following the motor vehicle 1/2 and, at the point in time t2, scans the driving route by an optical front camera 2 in location x0 and produces a rearward image 20. The rearward image 20 is, in turn, provided with a time and location stamp and is transmitted by way of the data network 15 to the central server 16. At the central server 16, the forward image 19 and the rearward image 20, which shows the oil slick 21, are analyzed and evaluated according to the process explained above by way of FIG. 3.

Figure 9:
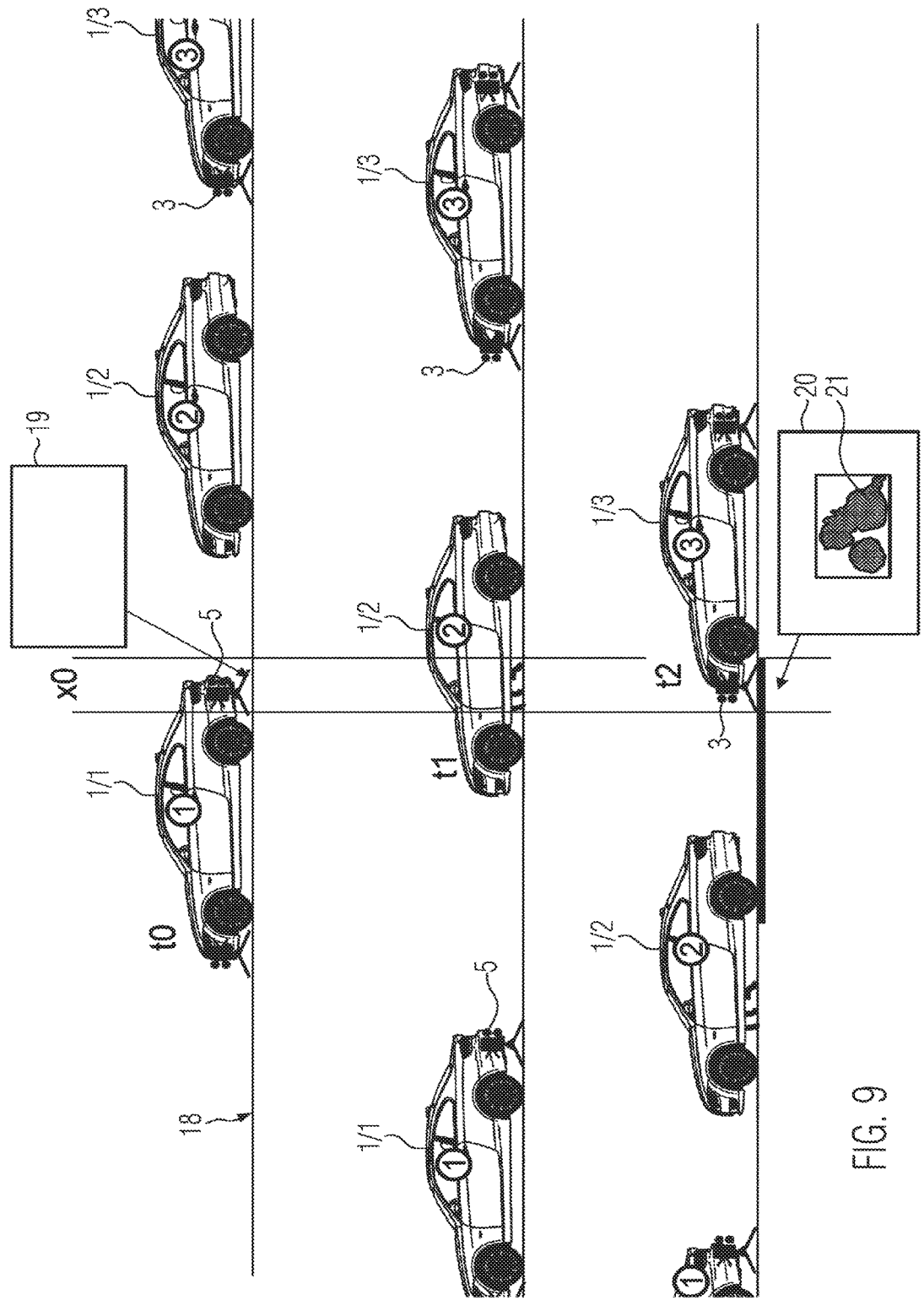

The sixth embodiment illustrated in FIG. 9 corresponds essentially to the fifth embodiment. It differs only as a result of the use of an infrared rear camera 5 on the vehicle 1/1 driving ahead and an infrared front camera 3 on the vehicle which follows. Both cameras 3, 5 are oriented perpendicularly downward with their viewing direction. By means of the latter, a thermal image of the driving route 18 (forward image 19 and rearward image 20 respectively) is produced, the rearward image 20 showing oil slicks 21 as thermal slicks. These thermal images can likewise be analyzed and evaluated by means of the process explained above by means of FIG. 3.

The above-explained embodiments show that cameras may be provided at different vehicles in order to be able to detect a loss of media. It is even possible to use different types of cameras or scanning devices in a joint process for examining a loss of media.

The above-explained embodiments show how a loss of oil can be detected. Likewise, by use of the process according to the invention, the loss of other media can be acquired and evaluated.

If the media are solid mechanical parts, an object recognition can also be carried out by a differential image. As scanning devices, radar sensors may be used, particularly radar sensors which radiate radar waves of a different wavelength.

REFERENCE NUMBERS

1 Motor vehicle
2 Optical front camera
3 Infrared front camera
4 Optical rear camera
5 Infrared rear camera
6 Central control device
7 Clock
8 Navigation system
9 Central vehicle control
10 Display device
11 Optical camera
12 Infrared camera
13 Radio interface
14 Antenna
15 Data network
16 Server
17 Front horizontal camera
18 Driving route
19 Forward image
20 Rearward image
21 Oil slick
22 Forward stereo video camera
23 Rearward stereo video camera The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for examining a loss of media of a motor vehicle, the process comprising the acts of:
    scanning, via a first camera, a route in an area in front of the motor vehicle that driving in a travel direction and is to be monitored;
    scanning, via a second camera, the route behind the motor vehicle to be monitored, wherein
    at least a forward image and a rearward image are acquired via the scanning of the route;
    comparing the forward and the rearward images in order to detect the loss of media by the motor vehicle being monitored,
    wherein comparing the forward and the rearward images comprises aligning the forward and rearward images, via a characteristic analysis, to coincide with one another.

2. The process according to claim 1, wherein
    before the forward and rearward images are compared with one another, the forward and rearward images are mutually adapted with respect to one or more of:
    resolution,
    contrast,
    color representation, and/or
    perspective.

3. The process according to claim 1, wherein
    a time and/or location stamp, respectively, is added to each individual image, which stamp indicates when the respective image was acquired and/or the location where the respective image was acquired.

4. The process according to claim 1, wherein
    the forward and rearward images are acquired by at least two cameras, which are arranged at the same motor vehicle.

5. The process according to claim 1, wherein
    the forward and rearward images are acquired by at least two cameras, which are arranged at different motor vehicles, the images being transmitted to a server, on which they are compared.

6. The process according to claim 1, wherein
    each of the first camera and second camera comprises an optical camera, an infrared camera, a laser scanner, or a radar sensor.

7. The process according to claim 1, wherein
    before the comparison of the forward and rearward images, in each case, a rearward image or a forward image consisting of a quantity of several rear or forward images are assigned to a forward image or a rearward image.

8. A motor vehicle, comprising at least one front camera and one rear camera for scanning of a driving route, and a control device which is configured to implement the process according to claim 1.

9. The motor vehicle according to claim 8, wherein each of the at least one front camera and one rear camera comprises an optical camera, an infrared camera, a laser scanner, or a radar sensor.

10. A system for implementing the process according to claim 1, comprising:
    at least two cameras, which are arranged on a motor vehicle, wherein the motor vehicle has a data connection to a server situated outside the motor vehicle, which server compares the forward and rearward images.

11. The system according to claim 10, wherein
    the two cameras are arranged on two different motor vehicles.

12. The system according to claim 10, wherein each of the at least two cameras comprises an optical camera, an infrared camera, a laser scanner, or a radar sensor.

13. The process according to claim 1, wherein in response to detecting a predefined medium, the method further comprises at least one of:
    informing a vehicle driver of the monitored vehicle;
    informing a public authority;
    informing traffic participants by car-to-car information, light signals and/or honking signals.

14. A process for examining a loss of media of a motor vehicle, the process comprising the acts of:
    scanning, via a first camera, a route in an area in front of the motor vehicle that driving in a travel direction and is to be monitored;
    scanning, via a second camera, the route behind the motor vehicle to be monitored, wherein
    at least a forward image and a rearward image are acquired via the scanning of the route:
    comparing the forward and the rearward images in order to detect the loss of media by the motor vehicle being monitored; and
    producing a differential image for the comparison, wherein objects in the differential image and/or corresponding objects in the rearward image are analyzed.

15. The process according to claim 14, wherein when analyzing the objects, a shape and/or spectral analysis is carried out.

16. The process according to claim 14, wherein several rearward images, which each show the object to be analyzed, are analyzed jointly via triangulation, so that a three-dimensional description of a surface of the object is produced.

17. The process according to claim 14, wherein each of the first camera and second camera comprises an optical camera, an infrared camera, a laser scanner, or a radar sensor.

* * * * *